(No Model.)
F. J. SPRAGUE.
DYNAMO ELECTRIC MACHINERY.
No. 380,144. Patented Mar. 27, 1888.
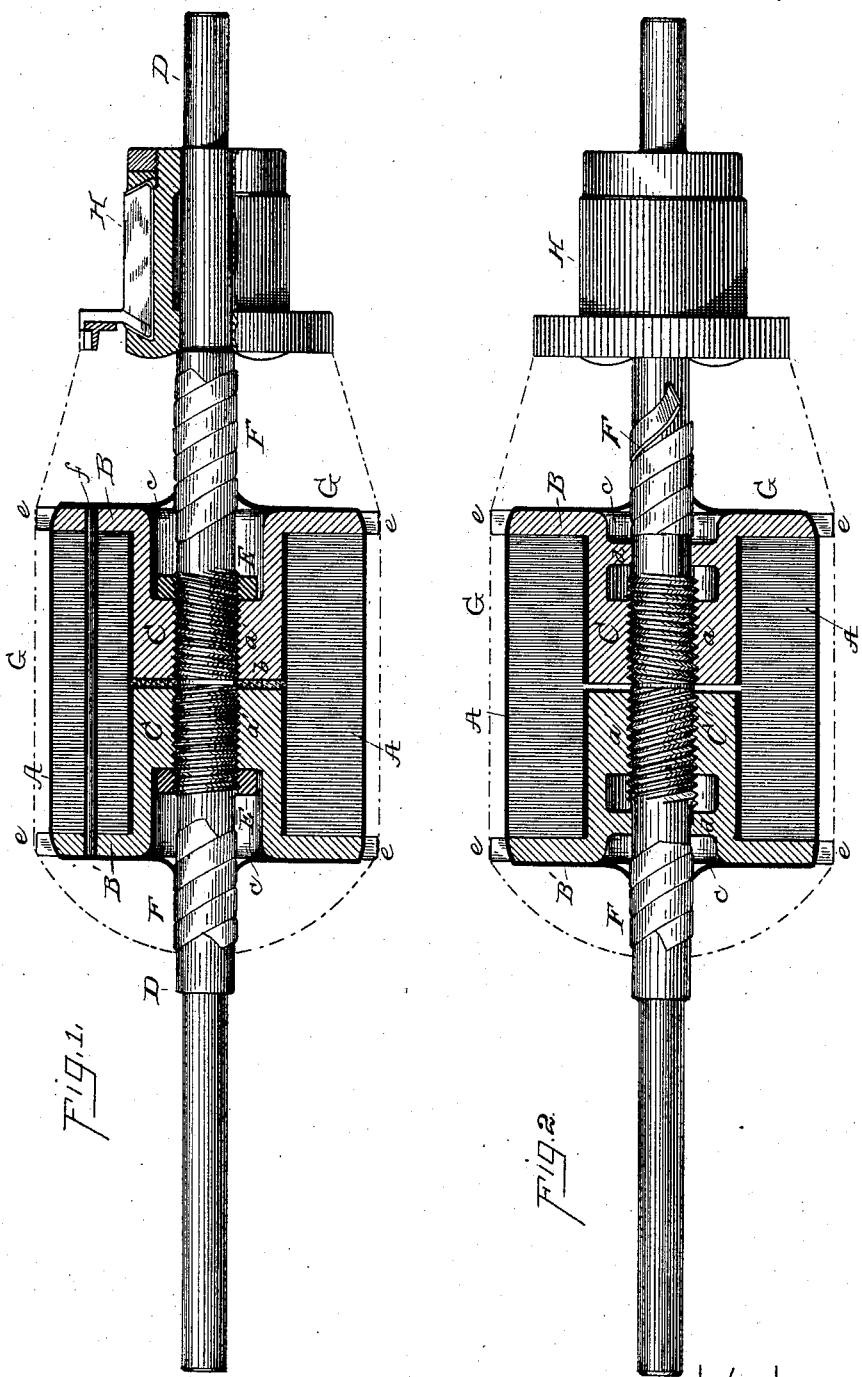

UNITED STATES PATENT OFFICE.

FRANK J. SPRAGUE, OF NEW YORK, N. Y., ASSIGNOR TO THE SPRAGUE ELECTRIC RAILWAY AND MOTOR COMPANY, OF SAME PLACE.

DYNAMO-ELECTRIC MACHINERY.

SPECIFICATION forming part of Letters Patent No. 380,144, dated March 27, 1888.

Application filed April 8, 1887. Serial No. 234,116. (No model.)

*To all whom it may concern:*

Be it known that I, FRANK J. SPRAGUE, of the city of New York, in the county and State of New York, have invented a certain new and useful Improvement in Dynamo-Electric Machinery, of which the following is a specification.

My invention relates to armatures for dynamo-electric machines and electro-dynamic motors, of that class in which the core is made up of a series of thin iron plates massed together upon a shaft; and my object is to produce an armature-core which shall be simple in its construction and efficient in use, and well insulated.

My invention consists in the novel devices and combinations of devices employed by me in accomplishing the above-named object, as hereinafter set forth and claimed.

In the accompanying drawings, Figure 1 is a longitudinal section of an armature-core embodying my invention, with the shaft in elevation; and Fig. 2, a similar view of a modified form of armature.

A A represent the series of thin sheet-iron plates, with paper or other thin insulation between them, which make up the mass of the core. B and B' are two thick end or clamping plates, each of which has a hub, C or C', upon the shaft, said hubs having internal screw-threads, as will be presently explained. D is the shaft, which has, preferably, at its middle part, as shown, two opposite screw-threads, $a$ and $a'$. These are the principal features of my invention. These parts are assembled together, as shown, the hubs C C', whose screw-threads correspond with the two screw-threads of the shaft, being screwed thereon, and the plates A A placed on said hubs between the end plates. The core is then placed in a lathe, or any other suitable means are employed, whereby the plates are held stationary and the shaft is revolved, or the shaft is held and the plates revolved. By means of the opposite screw-threads on the shaft this revolution draws the end plates together upon the shaft and brings all the plates into the closest possible mechanical contact.

When the machine is put in use, if it is a motor or generator which runs always in the same direction, this direction is such as will tend to bring the plates together upon the shaft. Consequently the plates can never work loose, since the operation of the machine acts constantly to keep them together. If, however, the machine is one which may have to run in either direction, I place upon the shaft outside the end plates at each end a locking-nut, E, Fig. 1, so that the plates cannot move back from the center, and since there is generally one direction in which the machine runs most of the time, it may be arranged that this direction shall be the one which tends to draw the plates together, so that this action occurs the greater part of the time. This arrangement provides a very simple and effective way of constructing the core, by which the plates are firmly and durably secured to the shaft and the exact centering of the armature on the shaft is always accomplished. This manner of attaching the core-disks together and to the shaft has other advantages also over the devices heretofore employed for this purpose. Where bolts are used they work loose by the wearing of the iron around them, and they also sometimes become bent or distorted by the expansion due to heating of the parts. Also, in stamping the bolt-holes in the plates burrs or roughnesses are formed, which may injure the insulation between the plates. Where the plates are keyed on the shaft the shaft is weakened by the cutting of the key-way. All of these objections are avoided by the use of my invention.

I may place between the hubs on the shaft a disk, $b$, of vulcanized fiber or other suitable insulating material, as in Fig. 1, or I may merely leave an air-space between them, so that they may maintain their tendency to move together, as seen in Fig. 2.

I provide the end plates or their hubs with recesses $c\ c$, within which the nuts E E, if they are used, may be placed. These recesses provide for the efficient insulation of the armature-coils from the shaft. In winding the armature, in the well-known way, the coils are brought over the ends and around the shaft, and there is danger, therefore, that should the insulation of the wires be defective contact may be made with the shaft and thus a ground or other connection formed through the base of the machine. It has been attempted to avoid this by placing insulation upon the shaft; but this is an imperfect plan, for there is always a chance of a crevice in the insulation, through which contact may occur or a discharge-spark may pass.

I wrap the shaft with paper, mica, or other suitable insulating material, F, and continue this wrapping within the recess of the end plate at each end of the core. Then the paper or other insulating wrapping, G, with which the core is covered, is brought around the ends, so as to meet the insulation on the shaft, and thus a continuous insulating-surface is provided under the coils, so that they cannot possibly come into connection with the shaft. The recesses in the ends of the core also permit the expansion of the coils due to heat without injury to them.

The dotted line indicates the canvas covering which is placed outside the coils, which are not themselves shown, and which covers the armature and its connections to the commutator H.

In the form shown in Fig. 2, in which the locking-nuts are not used, I may, in order to give more bearing-surface for the core on the shaft, provide within the hubs the flanges or collars $d\ d$, still preserving, however, the recesses $c\ c$ for the insulation. Where the nuts are used, this cannot be done, since the nuts must be inserted in the recesses.

The end plates have notches, in which pieces of vulcanized fiber, $e$, are inserted, as usual, between which the coils are wound. The paper covering is cut at these points so as to lie between the pieces $e$.

It sometimes occurs in the use of an armature that the paper insulation between the thin disks becomes destroyed, either by burning from contact between a coil and the core or by rotting away. In this case the plates may become loosened, so that they will not be held close together, and so one or more plates might be caused to turn slightly upon the shaft, so as to get out of place, and thus impair the operation of the machine. This contingency may never occur; but to guard against it I may, if desired, employ one or more stay-bolts, $f$, passed loosely through the whole length of the core, whereby any possibility of the turning of the plates on the shaft is avoided. The bolt $f$ may be wrapped with insulation, such as mica. Such insulation may also be placed between the plates A and the hubs of the end plates.

What I claim is—

1. The combination, with a shaft having upon it two opposite screw-threads, of an armature-core thereon composed of thin metal plates, and clamping end plates having screw-threads corresponding, respectively, with those on the shaft, between which the thin plates are compressed and held closely together, substantially as set forth.

2. The combination, with a shaft having upon it two opposite screw-threads meeting at the middle point of the shaft, of an armature-core thereon composed of thin metal plates, and clamping end plates provided with hubs having internal screw-threads corresponding, respectively, to those on the shaft, said end plates being screwed upon the shaft so that said thin plates are compressed and held closely together between them, substantially as set forth.

3. The combination of a shaft, an armature-core thereon having recesses in its ends around the shaft, and insulating-wrappings on the shaft entering said recesses, substantially as set forth.

4. The combination of a shaft, an armature-core having recesses in its ends around the shaft, insulating-wrappings on the shaft entering said recesses, and an insulating-covering upon the core meeting said wrappings at the ends thereof, substantially as set forth.

5. The combination, with the shaft having opposite screw-threads, of the core composed of thin metal disks, the end plates having screw-threads corresponding, respectively, to those on the shaft, said end plates being screwed upon the shaft so that said thin plates are compressed and held closely together between them, and the locking-nuts, substantially as set forth.

6. The combination, in an armature-core, of the thin plates massed together, clamping devices therefor, and the loose stay-bolt, substantially as set forth.

This specification signed and witnessed this 4th day of April, 1887.

FRANK J. SPRAGUE.

Witnesses:
F. A. MASON,
I. P. S. BRAULL.